June 20, 1961    G. WOHLBERG    2,989,136
SOUND ATTENUATION
Filed April 14, 1959    7 Sheets-Sheet 1
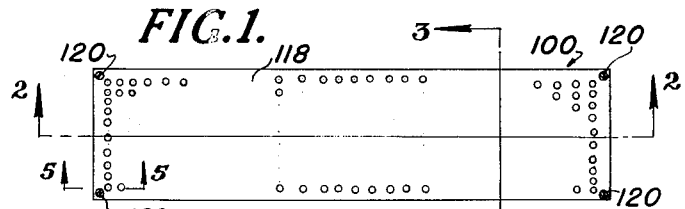
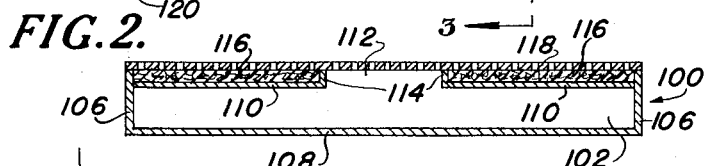
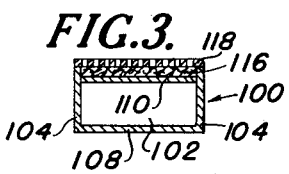
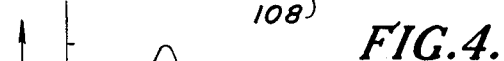
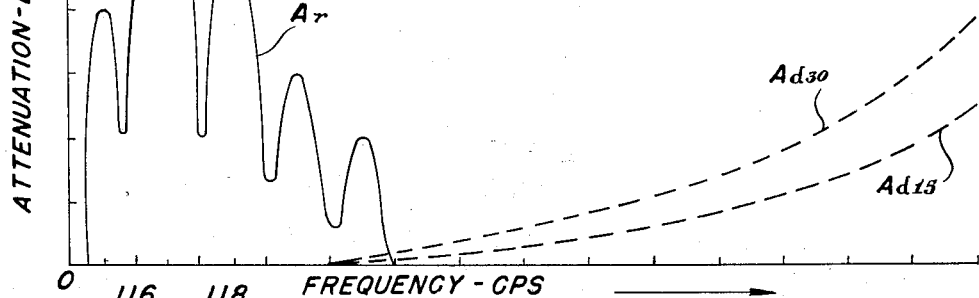
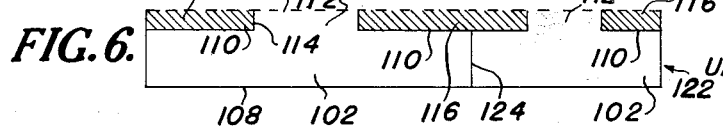
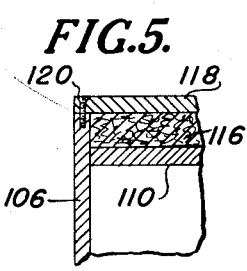
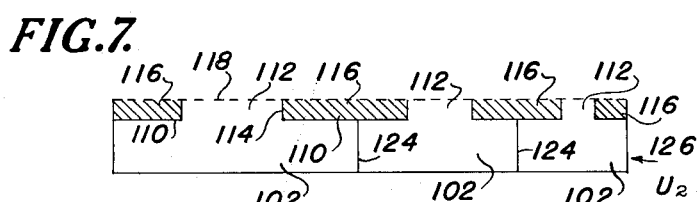
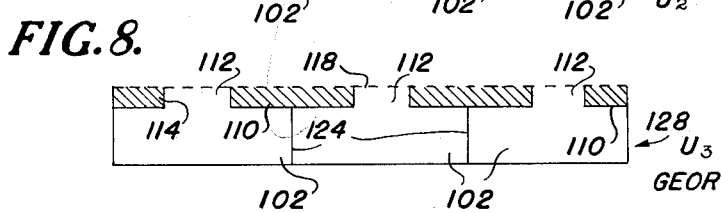
INVENTOR
GEORGE WOHLBERG
BY Cushman, Darby & Cushman
ATTORNEY

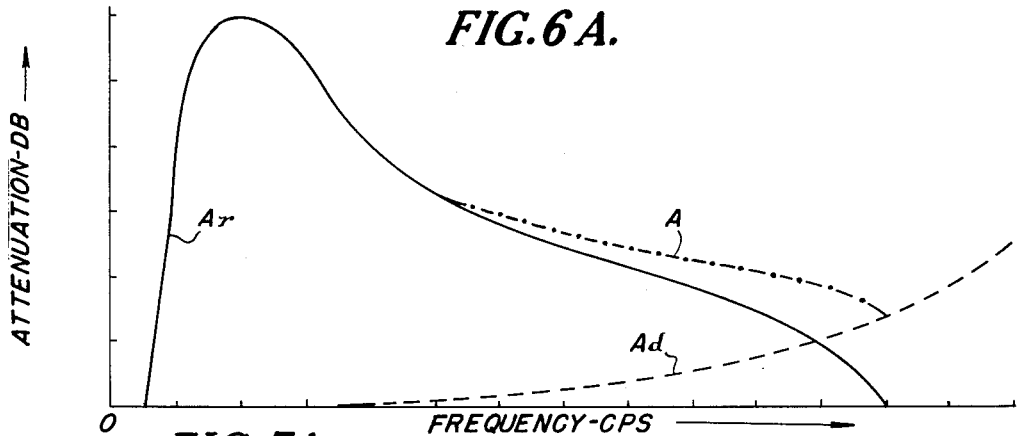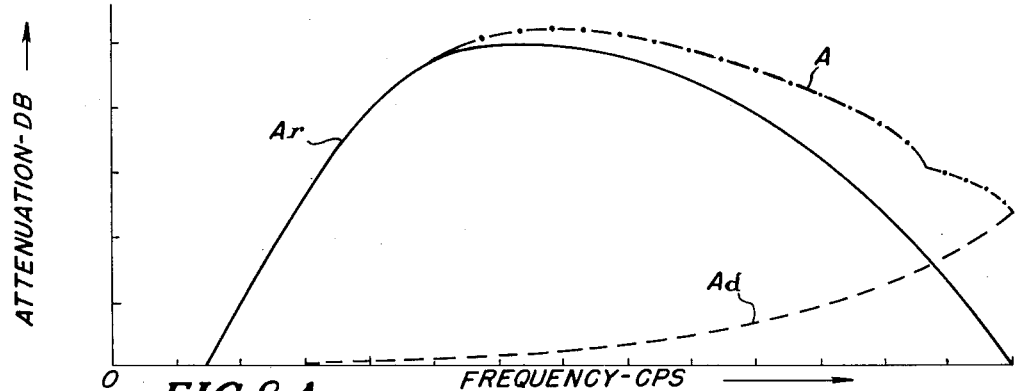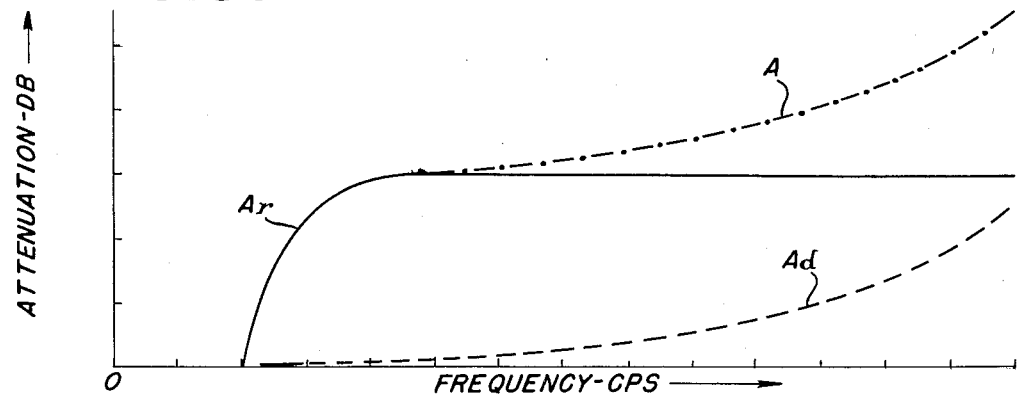

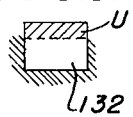
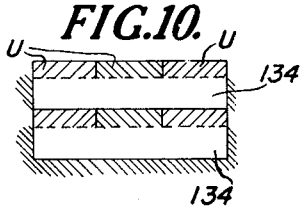
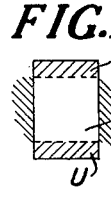
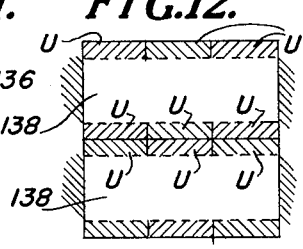
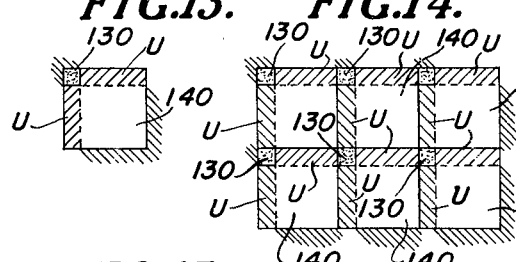
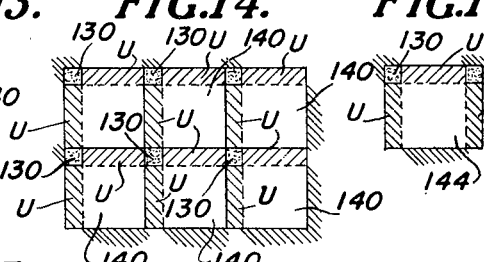
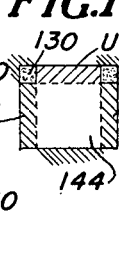
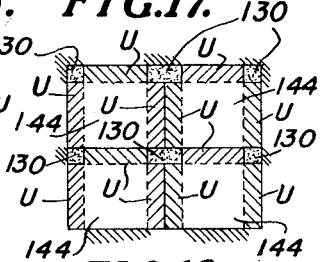
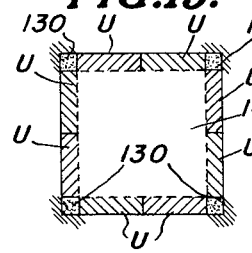
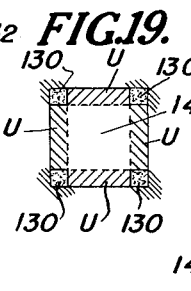
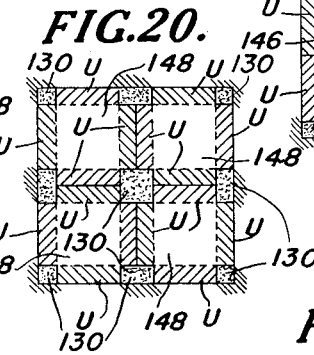
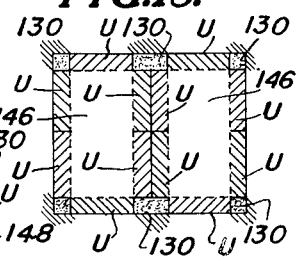
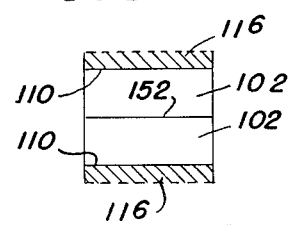
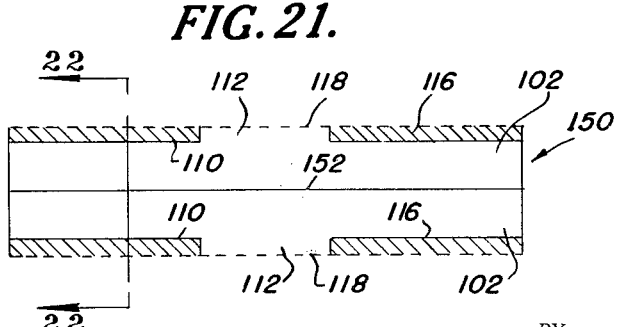

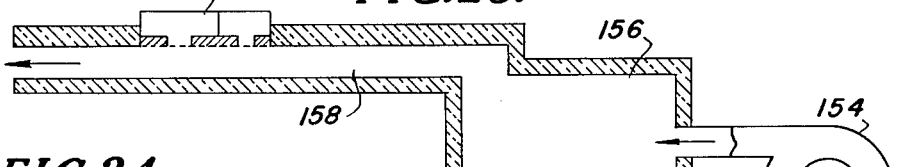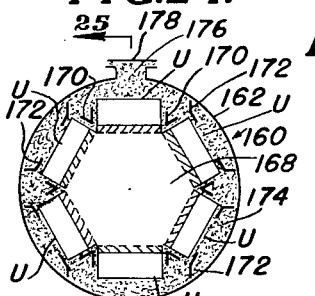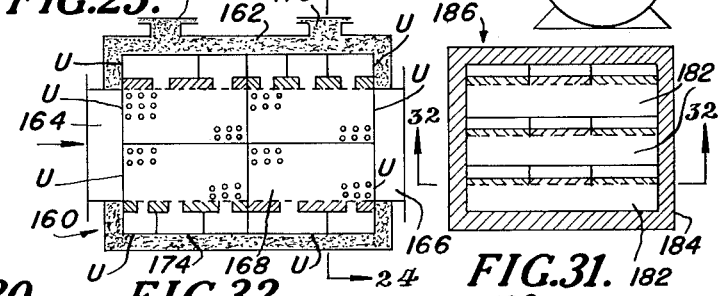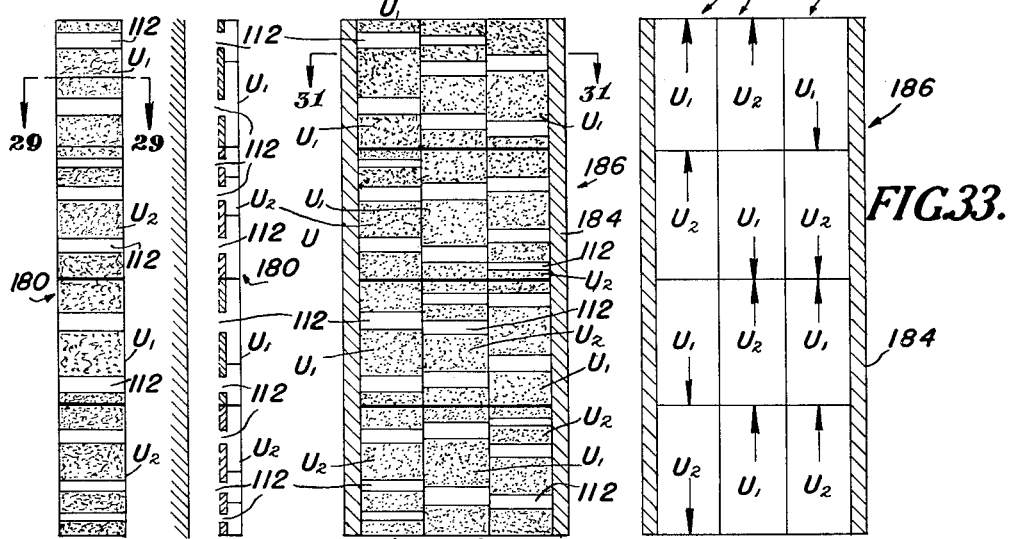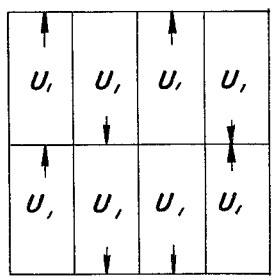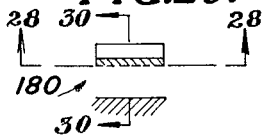

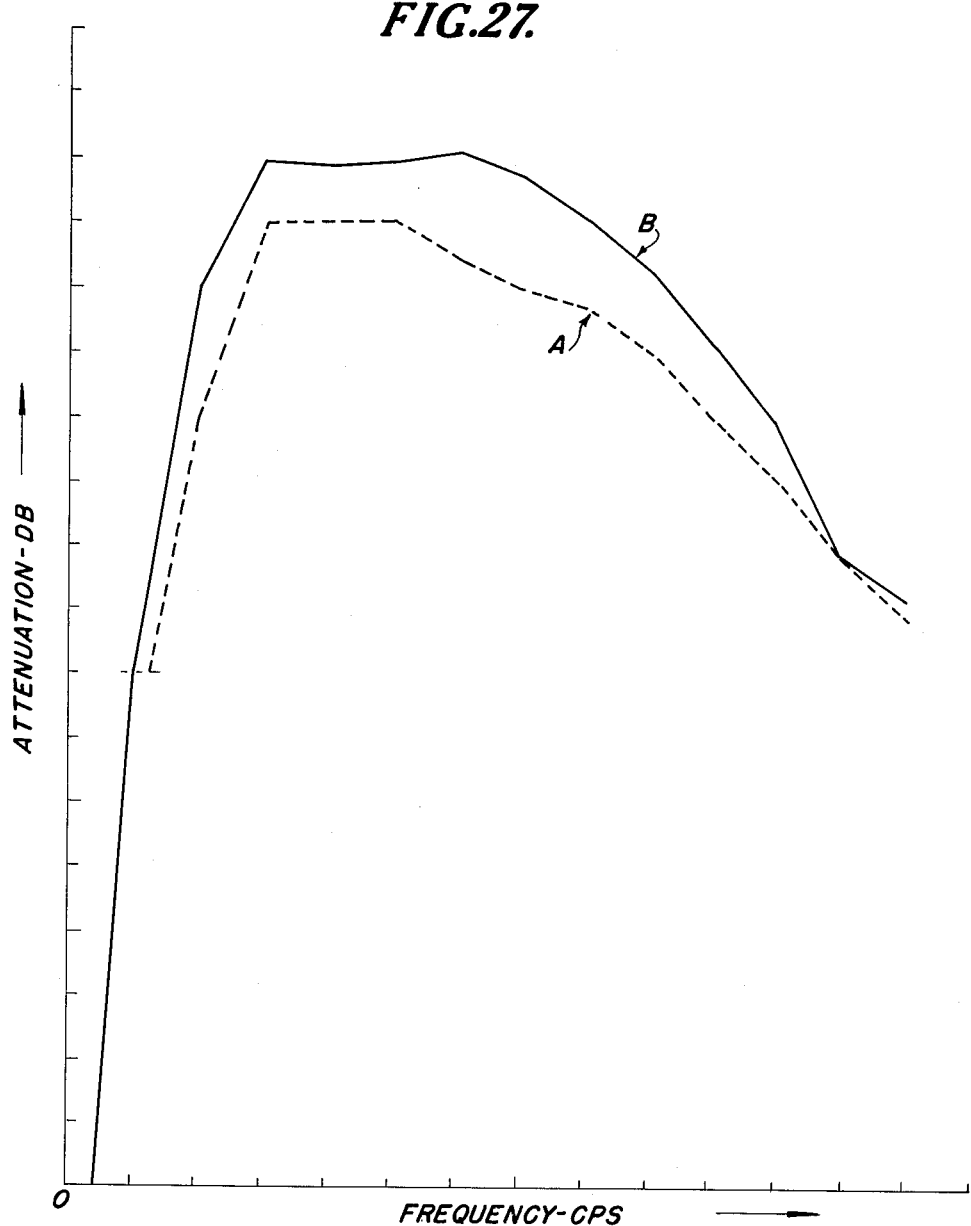

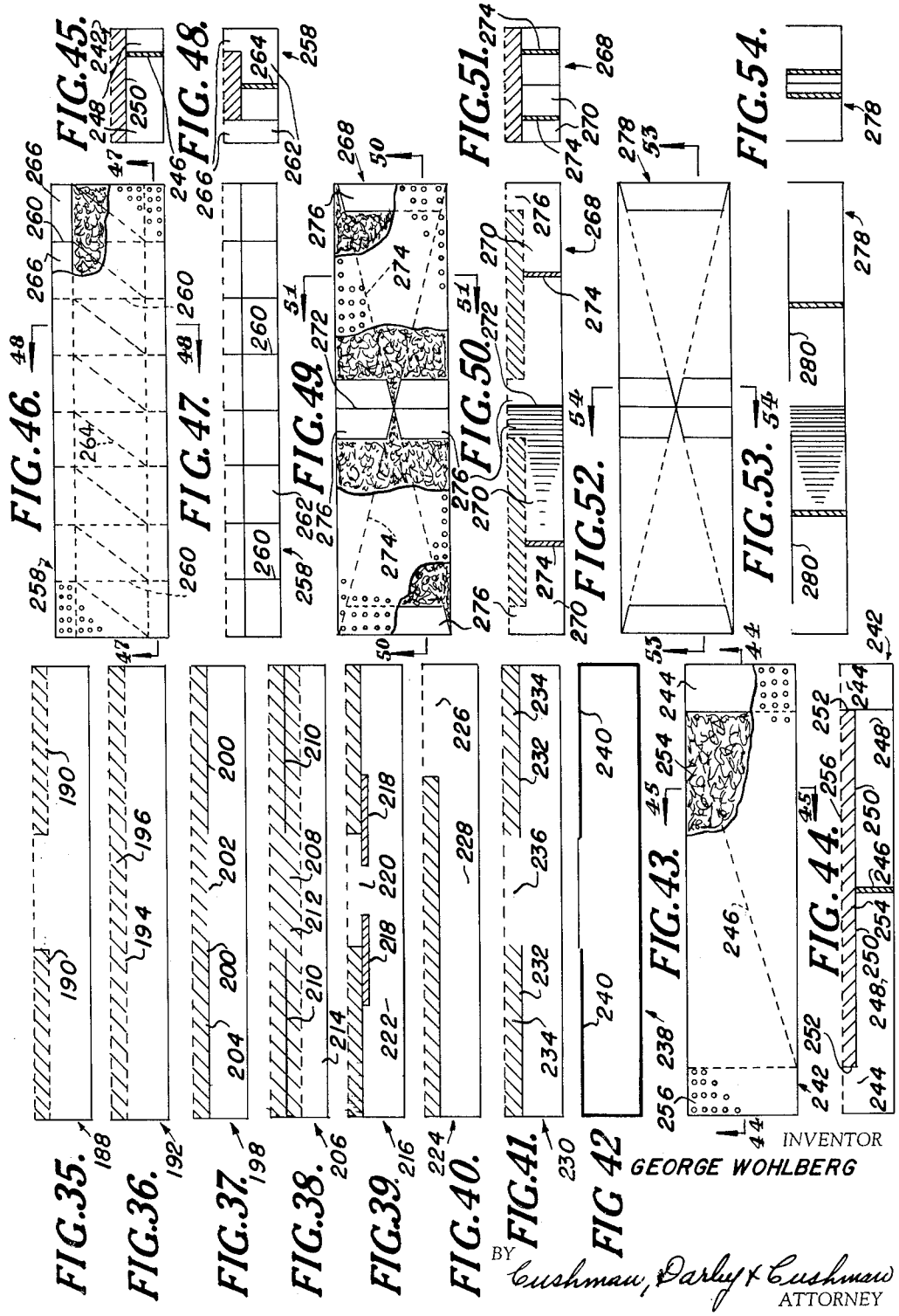

United States Patent Office 2,989,136
Patented June 20, 1961

2,989,136
SOUND ATTENUATION
George Wohlberg, 2509 Harmony Place,
La Crescenta, Calif.
Filed Apr. 14, 1959, Ser. No. 806,381
32 Claims. (Cl. 181—33)

This invention relates to sound attenuation or noise abatement, and more particularly to structurally and acoustically improved sound-attenuating structural units somewhat of the panel type.

The testing of modern aviation reaction engines, e.g. turbo-jet, turbo-prop, and ram-jet engines, requires noise control facilities which are capable of a high degree of sound attenuation over a wide frequency range and which can conduct large volumes of gases at high velocities. The noise control problem in the testing of such engines is an extremely difficult one, since such testing involves some of the most intense man-made noises in association with large rates of flow of highly heated gases. All of the currently-used noise control facilities have serious deficiencies and shortcomings relative to acoustic performance, gas-handling capacity, bulk, cost, durability, and suitability for economical modification to meet altered operating conditions. All of them suffer from having been developed originally for far less severe conditions of service than jet engine testing.

The most common noise abatement means for jet engine test cells comprises sound-absorbing panels, which contain some fibrous sound-absorbing material that is exposed to sound through foraminous facings, arranged to form a relatively large number of closely-spaced parallel walls whose length is very large compared to the spacing therebetween. The spaces between such curtain walls serve as sound-attenuating passages through which gases flow into and out of the engine test cells.

Jet engines, as well as many other types of noisy equipment and processes, generate large amounts of low-frequency sound energy, and therefore require large attenuations at low frequencies. Sound-absorbent panels of the aforementioned type are so extremely deficient in their capacity for attenuating low-frequency sounds that often it is impossible to use enough panels, in gas-handling structures of reasonable size, to provide sufficient low-frequency attenuation. At the same time the high-frequency sound-absorption characteristics of such panels are so good that frequently much more high-frequency attenuation is achieved than is needed. An 80 deficiency in low-frequency attenuation and a 400% unusable but costly excess of high-frequency attenuation are not uncommon with some structures which use sound-absorbent panels.

To offset the low-frequency attenuation deficiency of panel type noise suppression structures as much as possible, it is customary to space the curtain walls very closely, i.e. a spacing generally about equal to the panel thickness. The resulting resistance to gas flow then must be compensated for by reduction of gas velocity, but such reduction can be achieved only by the construction of more passages to handle the flow with resultingly larger and more expensive structures.

Another type of noise suppression structure used with engine test cells is in the form of a stack or duct lined with sound-absorbing porous masonry blocks so arranged as to form curtain walls, or honeycomb or labryinthine passages. Experience has shown that these block structures also are inefficient attenuators of low-frequency sounds. Furthermore, such structures tend to disintegrate from the vibration, gas pulsation, and thermal strains and stresses to which they are exposed in jet engine service.

A third type of noise suppression device which has been used to a limited extent with jet-engine test cells is the muffler type of silencer, which usually consists of a cylindrical casing or shell concentrically enclosing a perforated sound-attenuating conduit which forms an integral gas passage. Such mufflers have serious shortcomings and limitations which render them unsuitable for use with modern turbo-jet and turbo-prop engines. Inherent size and attenuation limitations are the most important deficiencies. The largest prefabricated muffler that can be shipped by railroad has a gas-flow capacity of about 600,000 c.f.m. and produces only about 20-db overall attenuation. Current requirements call for capacities of about 1,600,000 c.f.m. and 60-db attenuation. Since mufflers in large sizes are not suitable items for mass production, they must be largely custom-made by band. Consequently, their costs are relatively very high. Inflexibility as to expansion of capacity is another of their serious disadvantages.

The attenuation per foot of length obtainable with these mufflers diminishes as their gas passage diameter increases. Regardless of the type of sound-attenuating means surrounding the gas passage, the passage tends to become acoustically transparent to all sounds whose wavelengths approximate, or are smaller than, the passage diameter. Therefore, such mufflers tend to be poor attenuators of medium and high-frequency sounds in the large sizes needed for jet engine service. Furthermore, they are also inefficient attenuators of low-frequency sounds, because outside shell diameters and lengths as great as would be required for substantial low-frequency attenuation are precluded by practical shipping, fabricating and weight limitations.

Other factors which impair the theoretically obtainable attenuations of large mufflers are transparency of their shells or casings to sound, acoustic short-circuiting of the silencing elements through the metallic structure of the muffler, tendency of the main sound conduit to resonate, and susceptibility of the sidebranches to shock excitation.

Shell transparency results from the fact that as muffler size increases the shell thickness cannot, as a practical and economic matter, be correspondingly increased without weight and cost becoming prohibitively great. Moreover, as the diameter of the shell increases, its stiffness diminishes for a given thickness. The shell, therefore, vibrates and transmits sound more freely. Shell transparency reduces the attenuation of a muffler by augmenting the residual noise which issues through the gas path.

Acoustic short-circuiting results from the fact that the attenuating or silencing elements of mufflers may be by-passed by solid-borne sound transmitted through the shell and the conduit walls, as well as by diaphragm action of the partitions which separate the silencing elements. Such short-circuiting reduces the attenuation.

One of the most important inherent acoustical deficiencies of mufflers with straight-through gas conduits is the tendency of the main conduits to resonate as a whole or in sections of their lengths. Resonance renders the muffler acoustically transparent to the frequencies at which it occurs, thereby nullifying the attenuation which the muffler might otherwise have afforded at these frequencies. Fibrous damping materials are often placed around gas conduits in an attempt to suppress such resonances. It has been found that the effect of such materials in this respect is negligible, however, especially with large mufflers.

Another major fault which absorbent panels, masonry blocks, and mufflers have in common, is that their attenuation characteristics, and those of the structures into which they are incorporated, cannot be closely matched to the attenuation requirements of any particular situation. Such matching may be impossible to achieve even if the entire installation and its component acoustic units were custom-made, consequently, there usually is either a deficiency of attenuation at all frequencies, except those in a particular range, or a large excess of unneeded attenuation in all except a certain range of frequencies. The first case usually entails sacrifice of good performance to minimize cost, while the second requires a large investment in excess attenuation which cannot be utilized.

Still another common difficulty with conventional sound absorbent panels and mufflers is that they cannot, with any degree of economy, be made suitable for high-temperature service. The less expensive sound-absorbing materials, such as glass wool, used in these devices are unsuitable for temperatures over 350° F. The binders and lubricants which keep these materials from disintegrating burn off at about this temperature, and the glass wool is then destroyed by chafing induced by agitation produced by gas pulsation, etc. It is desirable to operate at temperatures much higher than 350° F., if possible, since this entails smaller total gas volumes due to reduced cooling air requirements. Higher temperatures, however, require the use of very expensive materials, e.g. stainless steel wool. Conventional mufflers and panels would become prohibitively expensive if filled with such a material, since large quantities are required. For example, a muffler of 6 ft. gas passage diameter by 45 ft. length, would require at least a 6-inch thick layer of steel wool around the gas passage, packed to a density of about 40 lbs. per cu. ft. At a current cost of about $1.50 per lb., this quantity of steel would cost about $54,000. Conventional panels, which would require several times as much stainless steel wool for an installation of equivalent capacity, would be even more prohibitively costly.

Accordingly, the objects of this invention are as follows:

To provide a structural building unit with a combination of means for efficiently attenuating sounds of both low and high frequencies, a plurality of units of identical overall dimensions serving for the assembly of noise abatement devices of any desired characteristics;

To provide means whereby the acoustical properties of such sound-attenuating building units may be varied without external changes, or changes in overall dimensions, that would affect the mechanical interchangeability of the units as structural elements;

To adapt the units to prefabrication and to the use of mass-production manufacturing methods by making a variety of internal components, used for obtaining different acoustical properties, interchangeable with one another within interchangeable external casings;

To provide sound-attenuating structural building units, with variable acoustic properties, which can be interchangeably and selectively assembled with other units of the same overall dimensions for the purpose of economically forming sound-attenuating and gas-conducting structures that have any desired flow capacity and flow resistance, and the acoustical characteristics of which can be "tailored" to match any desired sound-attenuation requirement at specified frequencies without either significant deficiency or excess of attenuation;

To provide means for facilitating the construction of sound-attenuating and gas-conducting structures which can be modified readily and inexpensively to suit altered requirements for gas flow and sound attenuation, through rearrangement, addition, or deletion of interchangeable structural building units;

To provide structural building units, with high sound-attenuating capacity per unit of volume, which can be installed in existing test cell facilities to replace conventional sound-absorbent panels for the purpose of improving both the acoustic efficiency and the gas-handling capacity of such structures;

To provide structural sound-attenuating building units which are suitable for high-temperature service at relatively low cost;

To provide sound-attenuating structural building units which, in addition to the other uses mentioned, are adaptable to forming sound-proofing enclosures for confining noisy equipment;

To provide such units which are self-supporting to serve as building elements which may be used without additional supporting framework;

To provide sound-attenuating structural units which can be shipped, handled, installed, and stored with ease and economy;

To provide relatively inexpensive means for making enclosures of high acoustic opacity for an assemblage of sound-attenuating structural building units, so that lightweight inexpensive materials of low acoustic opacity may be used for making the units without incurring the penalty of transmitting noise to the surroundings through the walls of the units;

To reduce substantially the possibility of solid-borne sounds short-circuiting the sound-attenuating elements of sound-attenuating structures by using discrete discontinuous units containing such elements;

To break up large reactive sidebranches in sound-attenuating structures into relatively small units, which are narrow in comparison to their length, so that low-frequency resonances in directions transverse to the lengths of the units may be minimized;

To provide an efficient and economical means for making silencing devices with large gas-handling capacities, through the use of dual sound-attenuating units common to adjacent gas paths;

To provide means for facilitating the changing of the sound-attenuating properties of a passage; and To provide a noise abatement device, having a gas passage therethrough, with improved means for minimizing the susceptibility of the passage to resonate in whole or in part.

Other objects and advantages of the invention will be evident from the following description and accompanying drawings, in which:

FIGURE 1 is a view of the sound-attenuating face of a typical unit embodying this invention.

FIGURE 2 is a longitudinal sectional view taken on line 2—2 of FIGURE 1.

FIGURE 3 is a transverse sectional view taken on line 3—3 of FIGURE 1.

FIGURE 4 is a chart showing the typical attenuation spectra of the unit shown in FIGURE 1.

FIGURE 5 is a fragmentary enlarged sectional view taken on line 5—5 of FIGURE 1.

FIGURE 6 is a diagrammatic longitudinal sectional view, corresponding to FIGURE 2, of a multi-chamber modification of the unit shown in FIGURE 2.

FIGURE 6A is a chart showing the typical attenuation spectra of the unit shown in FIGURE 6.

FIGURE 7 is a diagrammatic longitudinal sectional view, corresponding to FIGURE 2, of another multi-chamber modification of the unit shown in FIGURE 2.

FIGURE 7A is a chart showing the typical attenuation spectra of the unit shown in FIGURE 7.

FIGURE 8 is a diagrammatic longitudinal sectional view, corresponding to FIGURE 2, of still another multi-chamber modification of the unit shown in FIGURE 2.

FIGURE 8A is a chart showing the typical attenuation spectra of the unit shown in FIGURE 8.

FIGURE 9 is a diagrammatic transverse sectional view through an elementary form of a sound-attenuating sound or gas passage embodying this invention.

FIGURE 10 is a view corresponding to FIGURE 9, but illustrating an iteration of the passage shown therein.

FIGURE 11 is a diagrammatic transverse sectional view through another elementary form of a sound-attenuating sound or gas passage embodying this invention.

FIGURE 12 is a view corresponding to FIGURE 11, but showing an iteration of the passage shown therein.

FIGURE 13 is a diagrammatic transverse sectional view through another elementary form of a sound-attenuating sound or gas passage embodying this invention.

FIGURE 14 is a view corresponding to FIGURE 13, but showing an iteration of the passage shown therein.

FIGURE 15 is a view corresponding to FIGURE 13, but showing another type of iteration of the passage shown therein.

FIGURE 16 is a diagrammatic transverse sectional view through another elementary form of a sound-attenuating sound or gas passage embodying this invention.

FIGURE 17 is a view corresponding to FIGURE 16, but showing an iterated form of the passage shown therein.

FIGURE 18 is a view corresponding to FIGURE 17, but showing another type of iteration of the passage shown therein.

FIGURE 19 is a diagrammatic transverse sectional view through another elementary form of a sound-attenuating sound or gas passage embodying this invention.

FIGURE 20 is a view corresponding to FIGURE 19, but showing an iteration of the passage shown therein.

FIGURE 21 is a diagrammatic longitudinal sectional view, corresponding to FIGURE 2, but illustrating a duplex type of unit embodying this invention.

FIGURE 22 is a transverse sectional view taken on line 22—22 of FIGURE 21.

FIGURE 23 is a diagrammatic view, partly in longitudinal section, illustrating the application of units embodying this invention for the attenuation of sound in a plenum chamber and in a distribution duct connected to such chamber.

FIGURE 24 is a diagrammatic transverse sectional view, taken on line 24—24 of FIGURE 25, of a muffler type of sound-abatement device utilizing sound-attenuating units embodying this invention.

FIGURE 25 is a longitudinal sectional view taken on line 25—25 of FIGURE 24.

FIGURE 27 is a chart illustrating an attenuation requirement for a gas passage and the attenuation spectrum of a combination of units embodying this invention for satisfying the attenuation requirement.

FIGURE 28 is a diagrammatic view of the sound-attenuating face of an elementary longitudinal assembly of different types of units embodying this invention, which assembly corresponds to the curve B shown in FIGURE 27. The covers of the units are removed in order to more clearly show the openings in the attenuating faces of the units.

FIGURE 29 is a transverse sectional view taken on line 29—29 of FIGURE 28.

FIGURE 30 is a longitudinal sectional view taken on line 30—30 of FIGURE 29.

FIGURE 31 is a diagrammatic transverse sectional view through a sound-abatement structure having gas passages therethrough and constructed from the elementary assembly illustrated in FIGURE 28.

FIGURE 32 is a longitudinal sectional view taken on line 32—32 of FIGURE 31. Again, the covers of the several types of units are removed in order to show the openings in the sound-attenuating faces of the units.

FIGURE 33 is a diagrammatic representation corresponding to FIGURE 32, but illustrating, by arrows, the orientation of the various types of units shown thereon.

FIGURE 34 is a diagrammatic view corresponding to FIGURE 33, but showing how different orientations of a single type of unit embodying this invention may be utilized to achieve a desired result.

Figure 26:
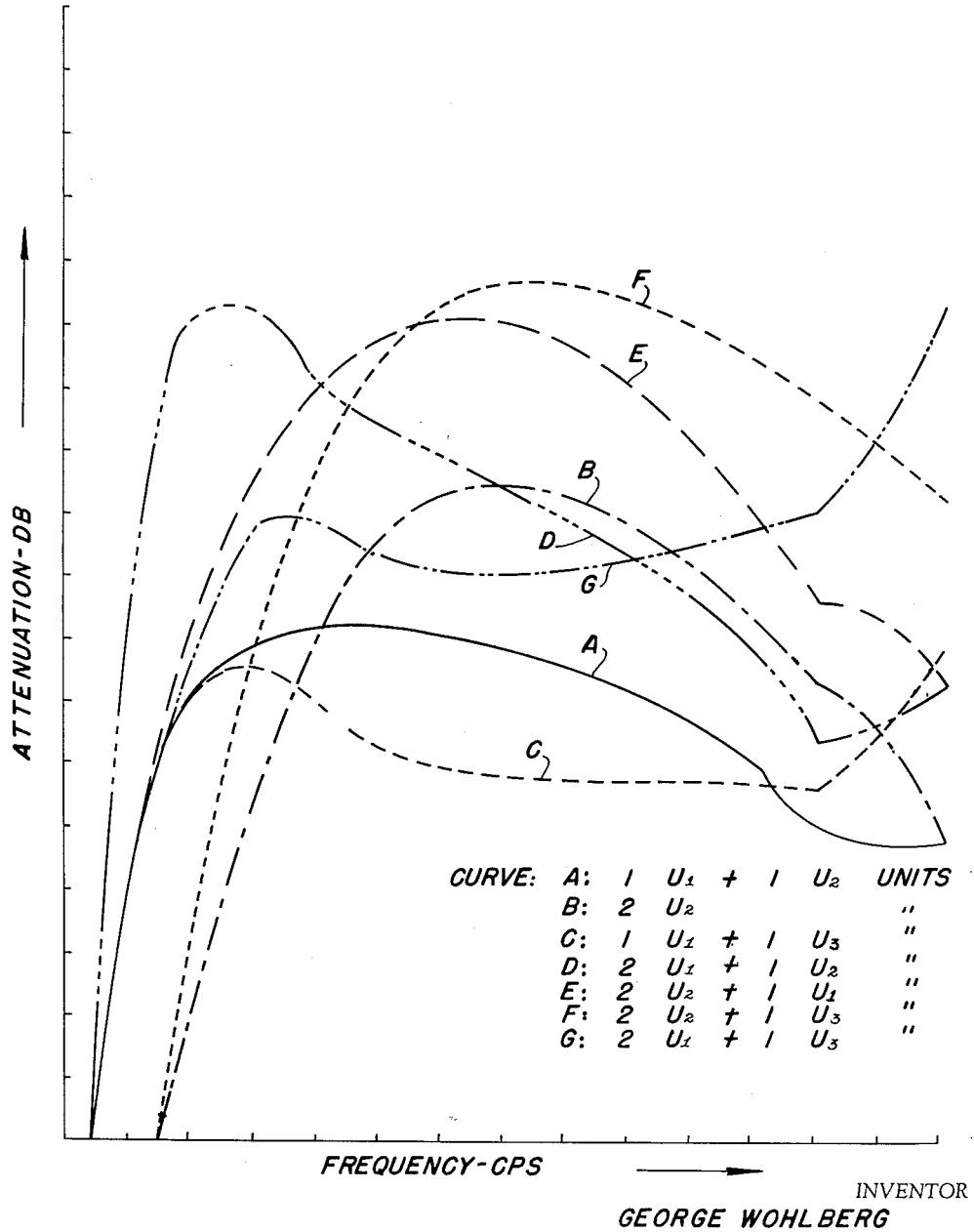
FIGURE 26 is a chart illustrating the attenuation spectra of various combinations of different types of sound-attenuating units embodying this invention.

FIGURES 35 through 42, inclusive, are diagrammatic longitudinal sectional views, corresponding to FIGURE 2, and illustrating different single-chamber modifications of the elementary unit shown in FIGURE 2.

FIGURE 43 is a view of the attenuating face of another modification of a sound-attenuating unit embodying this invention. A portion of the cover is broken away in order to illustrate details more clearly.

FIGURE 44 is a longitudinal sectional view taken on line 44—44 of FIGURE 43.

FIGURE 45 is a transverse sectional view taken on line 45—45 of FIGURE 43.

FIGURE 46 is a diagrammatic view corresponding to FIGURE 43, but illustrating a modification of the sound-attenuating unit shown therein.

FIGURE 47 is a longitudinal sectional view taken on line 47—47 of FIGURE 46.

FIGURE 48 is a transverse sectional view taken on line 48—48 of FIGURE 46.

FIGURE 49 is a diagrammatic view corresponding to FIGURE 43, but illustrating still another modification of the sound-attenuating unit shown therein.

FIGURE 50 is a longitudinal sectional view taken on line 50—50 of FIGURE 49.

FIGURE 51 is a transverse sectional view taken on line 51—51 of FIGURE 49.

FIGURE 52 is a diagrammatic view corresponding to FIGURE 43, but illustrating still another modification of the unit shown therein.

FIGURE 53 is a longitudinal sectional view taken on line 53—53 of FIGURE 52.

FIGURE 54 is a transverse sectional view taken on line 54—54 of FIGURE 52.

Referring now to the drawings, there is shown in FIGURES 1, 2, and 3 an elemental form of a sound-attenuating self-supporting structural building unit 100 embodying this invention. The unit 100 preferably is in the form of a right parallelepiped, i.e., in the shape of a building block, having a length greater than either its width or depth. The unit 100 is hollow, to provide a cavity or chamber 102 therewithin, and has five imperforate faces, i.e., two sides 104, two ends 106, and a back 108, which may be constructed in the form of a case. The remaining face, i.e., the front or sound-attenuating face of the unit 100, is partially closed by two spaced imperforate plate-like deck members 110 having a centrally-located rectangular opening 112 therebetween. The dimension of this opening 112, longitudinally of the unit 100, usually will be from about one-half to one-quarter of the length of the unit. While the shape of the opening 112 as shown in the drawings is rectangular, such a shape is not essential, nor is it essential for the opening to extend across the entire width of the unit, as is shown in the drawings, or be centrally located.

The deck members 110 are spaced somewhat below the front edges of the side and end walls 104 and 106 and have upstanding edges 114 adjacent the opening 112 to form tray-like receptacles in which pads 116 of sound-absorbing material are disposed. Such pads 116 may be formed of glass or steel wool or other materials well known in the art.

Overlying the pads 116 and the opening 112 is a foraminous or perforated cover 118, e.g. perforated sheet metal, which may be permanently secured to the side and end walls 104 and 106 or removably secured in place by any appropriate fastening means, such as the screws 120 shown in FIGURE 5. Although the foraminous cover 118 is not essential to the acoustical operation of the unit 100, such cover is desirable for several reasons. The use of such a cover presents to gases, moving parallel thereto, a smooth and acoustically transparent surface which minimizes flow resistance. The covering of the opening 112 with a foraminous cover does not deleteriously affect the acoustical properties of the unit. Most foraminous materials having at least 10% open area are usually acoustically satisfactory as cover materials. In addition to the foregoing, the cover 118 also serves to retain the pads 116 in place and to protect them from erosion and other damaging effects of high velocity gases. It is obvious, however, that certain kinds of sound-absorbing materials could be retained in place within the tray-like receptacles by means other than the cover 118, such as staples, adhesives, or wire mesh (not shown).

The unit case, deck members 110, and cover 118 may be formed of any suitable material appropriate for a particular service condition, such as sheet metal, plywood, plastic, etc. The size of the unit 100 obviously may be varied but it is contemplated and intended that the unit will be provided in several size series, the units of each series having the same standardized exterior dimensions. For example, the units in one series may be 96" long, 24" wide, and 12" deep or thick, while the units of a smaller series may be 32" x 8" x 4".

The unit 100 utilizes both the reactive and dissipative principles of sound attenuation when the front face forms a boundary of a sound channel or gas passage. Both low and high-frequency sounds are efficiently attenuated by units of relatively small volume. Substantial reactive attenuation at low frequencies is produced by the co-action of the opening 112 and the cavity 102 within the unit, which together constitute an acoustic sidebranch, while the thin pads 116 of sound-absorbing material provide high-frequency attenuation.

A typical spectrum of the attenuations afforded by the reactive and the dissipative elements of a unit of the type illustrated in FIGURES 1, 2 and 3, when the same forms a boundary of a sound channel or gas passage, is shown in FIGURE 4. The attenuation afforded by the cavity 102 is shown by the curve $A_r$, while the attenuation afforded by the pads 116 is shown by the curve $A_{d15}$. The curve $A_{d15}$ represents a pad thickness of only about 15% of the total thickness of the unit 100. Increases in thickness over this percentage, while increasing high-frequency attenuation, have negligible effect upon low-frequency attenuation, as shown, for example, by the curve $A_{d30}$ representing 30% pad thickness. Further, any increase in pad thickness above about 15% must be done at a sacrifice of low-frequency attenuation resulting from a corresponding reduction in cavity volume.

It is obvious, therefore, that for a given volume, a sound-attenuating unit embodying this invention will yield a far higher amount of low-frequency attenuation than would an equal volume of sound absorbent. It is also apparent that a relatively small thickness of sound-absorbing material, when effectively utilized, produces considerable attenuation at high frequencies. Hence, in units embodying this invention, the thickness of the pads 116 preferably is kept at 15 to 20% or less of the total thickness of the unit. This allows full utilization of the sound-absorbing material for high-frequency attenuation without a wasteful excess of high-frequency attenuation.

As described later, several units of a single size but having various types of low-frequency attenuation characteristics are usually assembled to form sound-abatement devices. The units are so selected that their low-frequency attenuation characteristics may be distributed over different frequency ranges, but the high-frequency attenuations of the pads 116 all cover the same frequency range, regardless of the types of units used. The high-frequency absorptions are, therefore, additive over this range. Two or three units often produce sufficient high-frequency absorption for almost every application.

Since only small quantities of sound-absorbing material are used to form the pads 116 of each unit, it becomes economically feasible to use relatively expensive materials, such as stainless steel wool, which permit operation of the sound-attenuating units at high temperatures. High temperature operation is advantageous because of smaller cooling air requirements, smaller total gas volumes, lower cooling water requirements, and, consequently, smaller sound-attenuating structures. The resulting savings in the cost of such structures oftentimes more than offsets the cost of expensive sound-absorbing materials.

A plurality of units embodying this invention, all of equal external dimensions, can be used to line or to construct sound-abatement devices in accordance with conventional practices, e.g. devices in the nature of intake or exhaust stacks or ducts for jet engine test cells, or for airplane run-up stands. Examples of the construction of sound-abatement devices utilizing structural building units embodying this invention will be given hereinafter.

In order to vary the acoustical properties of units embodying this invention, without affecting their interchangeability as structural building units, that is, without change of their exterior dimensions, interchangeable internal structures may be used. For example, and referring now to FIGURE 6, there is shown an internally modified form of unit embodying this invention. The unit 122 shown therein is of the same external dimensions and construction, i.e. case and cover 118, as the unit 100 shown in FIGURES 1, 2, and 3, save that three, instead of two, spaced deck members 110 are provided to form two openings 112 in the attenuating face of the unit 122. Correspondingly, three pads 116 are used. An upright transverse partition 124 separates the interior of the unit 122 into two sound-attenuating cavities or chambers 102 of unequal volume, each communicating with a sound field through one of the openings 112.

Other types of multi-chamber units may be similarly constructed to provide desired types of low-frequency attenuation characteristics. For example, the unit 126 shown in FIGURE 7 has three chambers 102 therein of three different volumes, each having an opening 112, while the unit 128 shown in FIGURE 8 has three chambers 102 therein, all of equal volumes, each again having an opening 112. In this connection, it is pointed out that while the unit 122 shown in FIGURE 6 has two chambers 102 of unequal volumes, in order to obtain certain desired attenuation characteristics, the two chambers 102 may be constructed to have equal volumes. It is again emphasized that all of the units 100, 122, 126, and 128 have identical exterior diamensions for any one size series.

Multi-chamber units with cavities of unequal volume are designed so as to eliminate the dips in the reactive attenuation curve of a single chamber unit, e.g. the curve $A_r$ shown in FIGURE 4. This result is accomplished by the provision of suitable acoustical overlap in the attenuation characteristics of the variously sized chambers. For example, if a single unit 122 of the type shown in FIGURE 6 is used to form a portion of the wall of a sound-conducting channel, the typical attenuation spectra of the reactive and dissipative components of the unit are shown in FIGURE 6A, wherein the line A represents the spectrum of the unit 122 and consists of the sum of the curves $A_r$ and $A_d$. Similarly, a unit 126 of the type shown in FIGURE 7 provides the typical attenuation spectra shown in FIGURE 7A, while a unit 128 of the type shown in FIGURE 8 provides the typical attenuation spectra of the type shown in FIGURE 8A. All these spectra are smoothed curves.

It will be seen, therefore, that substantial differences in attenuation characteristics can be achieved through the use of different interior structures, even though the exterior dimensions of the units remain unchanged. The attenuation characteristics of the foregoing types of multi-chamber units can be calculated approximately or can be determined by standard experimental methods well known and used in the art.

In order to render the units suitable for manufacture by mass production methods, a large variety of internal constructions, for different attenuation characteristics, can be provided largely through the use of interchangeable parts. For example, the cases or imperforate sides 104, ends 106, and backs 108, and the foraminous covers 118, of the units 100, 122, 126 and 128, are identical. The internal partitions 124 of the units 122, 126, and 128 also are identical. The sound-absorbing pads 116 of the units 100, 122, 126, and 128, being all of equal width, can be mass produced in a single operation simply by cutting such pads to proper length from rolls or long strips of sound-absorbing material. The deck members 110 of all of the units 100, 122, 126, and 128 are likewise identical as to width and upstanding edges 114 so that such members can be made from long strips by a process in which the strips are cut to proper length in one operation and the upturned edges 114 are formed in another operation. Hence, stockpiles of cases, covers, and internal elements can be prefabricated, so that whenever any quantity of a given type of unit is required, the standardized interchangeable internal parts can be assembled in their interchangeable cases by assembly-line methods to provide completed units with a variety of desired acoustical properties.

Standardization of parts and mechanical interchangeability of completed units offer significant operation characteristics not obtainable by existing means. For example, the units can be used as structural elements in the same sense as building blocks for constructing sound-abatement structures of many different configurations, gas handling capacities, flow resistance characteristics, and sound-attenuating properties. The units can be readily rearranged if alteration of service conditions dictates changes of configuration. The units lend themselves particularly well to replacement of other types of acoustical devices in existing structures where difficult combinations of spatial, dimensional, and performance requirements have to be met.

Conventional fastening or securing means may be used either separately or formed integrally with the units to facilitate their assembly into sound-abatement devices. In this connection, it will be apparent that the cases and/or covers of the units may be provided with apertured tabs, ears, flanges, lugs (not shown), or other types of known structural expedients for connecting the units together or to a supporting framework or structure. Fastening means may even pass through appropriate apertures in the sides, ends, or backs of the units provided such means substantially closes the aperture. If of metal, the units may even be welded together along edge portions. It further will be noted that the units, when formed by material of adequate structural strength, and with their covers fastened in place, are completely self-supporting and can be stacked, with appropriate securing devices, to either form a gas passage or sound channel or line the walls, or a portion of the walls, of an existing passage or channel or to subdivide the passage or channel of a structure into a plurality of sound-attenuating smaller passages.

Some of the basic configuration possibilities are indicated in FIGURES 9 through 20, inclusive, although many other variations will be obvious to those skilled in the art. These figures all represent transverse sections of sound and gas conducting passages having the boundaries thereof formed partly or entirely of assembled sound-attenuating units U embodying this invention. In all instances the sound-attenuating or front faces of the units U in these figures are indicated by broken lines and the units are arranged longitudinally of the passages. In certain cases the passages have non-attenuating boundaries formed by wall structure means other than the non-attenuating faces of the units U. For convenience in diagrammatic representation, the units U are shown as though they were solid throughout. Further, cross-sectional areas, between non-attenuating faces of the units and other wall structure, through which sound could pass without attenuation, are blocked off by suitable means such as plates, or are sand filled, as illustrated at 130.

FIGURE 9 illustrates the use of the sound-attenuating units U for lining or forming one side of a narrow sound passage 132. FIGURE 10 extends this idea to several wide sound passages 134 arranged in parallel. Cross-sectional configurations of the type shown in FIGURES 9 and 10 usually are used where sound attenuating requirements are very simple or where overall cross-sectional dimensions must be confined to a minimum.

FIGURES 11 and 12 similarly illustrate cross-sectional configurations where the units U are used to line, or to form, opposite sides of narrow and wide sound passages 136 and 138, respectively. These configurations normally are used where medium high attenuation with fairly short passage length is required.

FIGURE 13 illustrates a configuration for passage 140 having approximately the same attenuation per unit of passage length as the configuration shown in FIGURE 11. The iterated form of FIGURE 13 configuration, forming a multiplicity of passages 140 as shown in FIGURE 14, has somewhat higher attenuation per unit of passage length than the configuration shown in FIGURE 12 for the same total passage area and length, but has somewhat higher flow resistance.

The configuration for passage 142 shown in FIGURE 15 is derived, somewhat, from the configuration shown in FIGURE 13, and is used in cases where minimum flow resistance per unit of passage length is more important than high attenuation.

FIGURES 16 and 17 show configurations which provide the formation of gas passages 144 having three attenuating sides. The fourth side of each passage 144 is the non-attenuating back 108 of a unit U whose attenuating side faces an adjacent passage. This configuration or construction is used in instances requiring high or complex attenuation with short passage length.

FIGURE 18 shows an extension of the basic arrangement shown in FIGURE 17 to passages 146 lined on four sides with attenuating faces of units U. The attenuation of this configuration is intermediate between those of the configurations shown in FIGURES 12 and 17, for the same passage area and length.

FIGURES 19 and 20 show basic and iterated constructions having passages 148 lined with attenuating faces on four sides. These constructions are intended either for cases where shortest possible passages are required consistent with certain attenuation, or where a maximum of attenuation is to be attained with a given area and length of passage.

As discussed more in detail in the patent to Mason, 2,308,886, side branches, such as are defined by the units U, appear to have an attenuating influence for only a limited distance outwardly of their attenuating faces. Thus, for example, in the arrangement shown in FIGURES 9 and 10 the dimensions of the respective passages 132 and 134 normal to the attenuating faces of the units U should not be greater than about one-half the wavelength of sound corresponding to the highest frequency to be attenuated in such passages by the reactive attenuation elements of the units. In the arrangements shown in FIGURES 11 and 12, wherein opposite walls of the respective passages 136 and 138 are formed by the attenuating faces of units U, the dimensions of the passages normal to such faces, i.e., the spacing between opposed faces, should not be greater than about the wavelength of sound corresponding to the highest frequency to be reactively attenuated. In other words, as mentioned in column 2, lines 20–28, herein with regard to conventional mufflers, the passages 136 and 138 will tend to become acoustically transparent to all sounds whose wavelengths approximate, or are smaller than, the dimensions of such passages normal to the attenuating faces of the units U.

The use of back-to-back units U as shown in FIGURES 12, 17, 18 and 20 is to be noted particularly. The partition between separate passages formed by these back-to-back units U can be made either of two individual units U with their backs 108 abutted, or they can be made by a duplex unit 150, such as that shown in FIGURES 21 and 22. This duplex type of unit essentially consists of two integral units of the type shown in FIGURES 1, 2 and 3, or in FIGURES 6, 7, or 8, having a common back 152, so that the depth or thickness of a duplex unit is double that of a single unit. In other words, one duplex unit is exactly interchangeable dimensionally with two single units.

The duplex construction is desirable for several reasons. One is the saving of material and labor through substitution of a single back 152 for two backs 108, and through other obvious fabrication simplification. Since the duplex unit is used to form the sound-attenuating sides of two adjacent passages, installation cost is halved relative to that of the two single units which it replaces. Another important and novel advantage is that since the common back 152 is exposed to balanced pressures and identical sound frequencies on both sides, its tendency to vibrate at its natural frequencies will be suppressed by the phase opposition of the existing forces acting on its two opposite sides. Because of this beneficial effect, lighter material and less stiffening can be used for the common back 152 than would otherwise be necessary for suppressing undesirable resonant vibrations. Obviously, this same duplex constructional principle can be extended to form a duplex unit (not shown) having two integral single units arranged side-by-side and with a common side wall. It is to be particularly noted that in order to obtain the phase opposition benefits of the duplex unit 150 shown in FIGURE 21, the construction of the unit must be identical on opposite sides of the common back 152.

Still other benefits are obtainable through the use of duplex units 150 of the type shown in FIGURE 21 in that it eliminates the formation of an airspace extending parallel to the direction of gas flow between abutting backs 108 of two single units, which space is readily transparent to sound.

FIGURE 23 shows a typical installation of sound-attenuating units U embodying this invention for the abatement of sound caused by the discharge of air from a blower 154. The blower 154 supplies air to a masonry plenum chamber 156 for discharge into a masonry distribution duct 158. Portions of the wall of the plenum chamber 156 may be cut away and sound-attenuating units U embodying this invention installed in such cutout portion of the chamber wall so that their attenuating faces are substantially flush with the inner surface of such wall. Similarly, portions of the wall of the duct 158 may be cut away and sound-attenuating units U embodying this invention installed therein.

Referring now to FIGURES 24 and 25, there is shown therein the use of this invention to form an improved sound-abatement device 160 of the muffler type. The device 160 comprises a cylindrical outer shell 162 having inlet and exhaust openings 164 and 166 in the ends thereof. Arranged within the shell 162 to form the walls of a gas passage 168 extending between the inlet 164 and outlet 166 are a plurality of sound-attenuating units U embodying this invention. As illustrated in FIGURES 24 and 25, twelve such units U are employed to form a passage 168 of hexagonal cross section. Circumferentially adjacent units U may be secured to each other by means of longitudinal fastening members 170, while the entire assembly of the units U may be supported on the shell 162 by means of the brackets 172. It will be particularly noted that the brackets 172 are secured to the units U at the edges of the latter, at which point the units vibrate the least, and hence transfer a minimum of vibration to the outer shell 162.

Preferably, the triangular spaces between circumferentially adjacent units U and the space between all of the units and the inner wall of the shell 162 are filled with sand 174, or a similar filling, which may be introduced through upper filling openings 176 provided with suitable closures 178. Sand provides an inexpensive means of obtaining a massive wall structure of high acoustic transmission loss, while permitting the use of inexpensive light gage materials for both the cases of the sound-attenuating units U and for the outer shell 162. A composite wall structure of this type, using only 10-gage steel walls and a 6-inch thick sand layer, is acoustically as effective as a 1½-inch laminated steel wall that would cost about five times as much.

It also will be noted that in the muffler type of sound-abatement device 160 both circumferentially and longitudinally adjacent units U possess different attenuation characteristics afforded by different internal construction. The reasons for such staggering of units having different attenuation characteristics will be described more fully hereinafter.

As has been heretofore set forth, the attenuation spectra shown in FIGURES 6A, 7A and 8A illustrate the attenuation characteristics of three typical sound-attenuating units, such as the units 122, 126 and 128 shown in FIGURES 6, 7 and 8. These units 122, 126 and 128 may be designated, for convenience in further description, as types $U_1$, $U_2$, and $U_3$, respectively. Type $U_1$, $U_2$ and $U_3$ units may be used singly or in various combinations to achieve a large variety of attenuation curve shapes and amplitudes. Some of the many attenuation curves attainable with one, two or three of these types of units in various combinations are illustrated in FIGURE 26. The attenuation curves illustrated in FIGURE 26 represent the summations of the spectra of various combinations of individual units U arranged acoustically in series on a sound channel. The combinations of units represented by the curves are indicated by the tabulation on the chart.

It may be well at this point to explain the process of building up gas passage sound-abatement structures, the performance characteristics of which conform to any specific set of requirements. If, for example, the attenuation curve A, as shown in FIGURE 27, represents a sound-attenuation requirement to be satisfied and assuming that unit types $U_1$, $U_2$, and $U_3$ are available to be used in the type of iterated cross-sectional configuration illustrated in FIGURE 10, several trials of these units in various combinations reveal the fact that a basic or elementary assembly consisting of two $U_1$ plus two $U_2$ units arranged in series in the direction of gas flow meets the attenuation requirement with the fewest number of units. The summation attenuation curve of this elementary assembly is shown by curve B of FIGURE 27. The fundamental economy of this method of making attenuating structures through the use of individual units embodying this invention is shown by the act that there is neither a deficiency nor substantial excess of attenuation obtained.

FIGURES 28, 29 and 30 show the elementary assembly 180 thus obtained for the sound-attenuating structure to be constructed. The complete structure, however, must have a certain flow capacity at some certain specified gas velocity consistent with the allowable pressure drop. In order to obtain the total flow capacity required, a suitable number of elementary sound-attenuating assemblies 180 may be paralleled, until the desired total gas capacity area is obtained. For best acoustical performance, it is desirable to keep the area of gas passages as small as is consistent with required flow characteristics and to use several of such passages in parallel. Hence, the flow capacity requirement may be attained, for example and as illustrated in FIGURES 31 and 32, by three parallel passages 182, formed by an enclosing wall 184 and nine assemblies 180. This final sound-abatement structure 186 meets both the given attenuation and gas flow requirements. Such requirements may be necessary, for example, for both the intake and exhaust ducts or stacks of a jet engine test cell.

The final configuration illustrated in FIGURES 31 and 32 consists of a multiplicity of elementary assemblies 180, the attenuations of each of which are equal, since the assemblies 180 are identical as to the number and types of units $U_1$ and $U_2$ used in each. The attenuation of the structure 186 is equal to that of an elementary assembly 180, inasmuch as the elementary assemblies forming the structure are acoustically in parallel.

At this point it is desirable to point out that the theoretical sound attenuation afforded by structures, such as that illustrated in FIGURE 31, could not be realized in practice except for certain novel features of this invention. Passages in conventional sound-attenuating structures tend to become resonant at the natural frequencies corresponding to the major passage dimensions, i.e., length and major transverse dimension. Passage resonance causes serious loss of attenuation, and sometimes even an amplification of sound at the frequencies at which such resonance occurs. This defect is shared both by conventional mufflers as well as by sound absorbing panel structures having general configurations similar to the twelve-unit wall structures illustrated in FIGURES 31 and 32. Resonance effects usually are most pronounced in structures of large flow capacity which normally have passages of relatively large major transverse dimension in order to minimize flow resistance.

This invention makes it possible to retain the advantages of low resistance to gas flow offered by relatively large passages, while avoiding loss of attenuation through resonance. One feature of the invention which suppresses resonances is that the individual sound-attenuation units U tend to break up the large length and major transverse passage dimensions into numerous acoustically short sections represented by the distances between acoustic sidebranch openings 112. The natural frequencies of these acoustically short passage sections lie within the attenuating range of at least some of units U and are, therefore, partly suppressed.

Suppression of resonance in this way still may involve considerable loss of potential attenuation. Conventional mufflers, which have reactive sidebranches that break up main passages into acoustically short lengths between sidebranches, particularly suffer from this effect. Since the sidebranches in a conventional muffler surround the main passage in some symmetrical way, i.e., symmetrical about the longitudinal axis of the gas passage, all portions of each sidebranch act in phase. Hence, any tendency toward resonance of main passage longitudinal sections between sidebranches is reinforced, rather than suppressed, in conventional mufflers. This invention overcomes this serious difficulty uniquely and simply.

A sound passage such as 182 in FIGURES 31 and 32 may be regarded as consisting of several narrow strips each having a width equal to the width of a single unit U and having a length equal to the length of the strip 180. If the units $U_1$ and $U_2$ comprising the attenuating wall of each strip were identically arranged as to sequence and orientation, the natural frequencies of the longitudinal passage sections between sidebranch openings 112 would be identical for all strips. Therefore, the several strips would tend to act in phase and any residual tendency toward resonance would be reinforced. By means of this invention, however, it is possible to change both the sequence and orientation of the sound-attenuating units $U_1$ and $U_2$ in each strip so that adjacent strips do not have identical longitudinal sidebranch-spacing patterns. Thus, different sidebranch-spacing patterns for adjacent strips are clearly illustrated in FIGURE 32 wherein the foraminous covers 118 of the units $U_1$ and $U_2$ are left off to show the openings 112. In this connection, it is pointed out that the pattern of openings 112 in each of the units $U_1$ and $U_2$ is unsymmetrical with respect to the transverse center line, or to the ends of the attenuating face of the unit.

In order to better illustrate this principle, reference is made to FIGURE 33, which corresponds to FIGURE 32 but schematically illustrates the units $U_1$ and $U_2$. In FIGURE 33, however, the reference orientation of each unit $U_1$ or $U_2$ is designated by the arrows. It readily will be apparent from an inspection of FIGURE 33 that the sidebranch-spacing patterns in laterally adjoining strips are completely different because both the sequence and orientation of the units $U_1$ and $U_2$ in adjoining strips are different. Each strip, therefore, has a different natural frequency pattern, and thereby exercises a strong suppressive influence against sympathetic resonance with adjacent strips. Since the problem of resonance of the entire passage 182 and sections thereof thus may be avoided, practically the entire theoretical attenuation afforded by the units $U_1$ and $U_2$ may be realized.

Irregularities of sidebranch spacing as described above, also strongly suppresses resonances which would tend to occur laterally in the passages, i.e., in the direction of the width thereof.

The aforedescribed deresonating phenomenon may be explained to some extent by considering the medium in a sound conducting channel, that is bounded by several adjacent or opposed strips of units, as being divided into contiguous longitudinal segments with at least one side of each segment being defined by a strip. The width of this strip is equal to the width of a unit, and the length of the strip is equal to the length of the sound-conducting channel bounded by the units. Because of the differences in side branch spacing in each strip, the natural frequency of longitudinal vibration of each section of each segment which extends longitudinally between the side branches of its side-defining strip will be different from that in the contiguous section or sections of the contiguous segment which has a side defined by an adjacent or an opposed strip. Such differences in natural frequencies will be associated with corresponding differences in vibratory velocities and phase. Consequently, mutual restraints, somewhat in the nature of damping forces, will be exerted along the interfaces between contiguous segments on the tendency of each section of each segment to vibrate longitudinally at its own natural frequency.

The same principle of de-resonating passages may be applied to any configuration involving sound-attenuating units of this invention. For example, each of the four passages illustrated in the configuration shown in FIGURE 20 can be similarly de-resonated and made maximally attenuated. Considering any particular passage 148, the units U, having different attenuation characteristics and which comprise the sound-attenuating faces of the four passage sides, can be so oriented and sequenced as to make the sidebranch-spacing pattern of each side different from those of the adjacent and opposite sides. This is possible even when the structure is built only of one type of unit, e.g. $U_1$, $U_2$, or $U_3$, which has the aforementioned unsymmetrical arrangement of its openings 112. An extreme case of this type is illustrated in FIGURE 34, which is patterned after the showing of FIGURE 33 but illustrates a sequence and orientation of type $U_1$ units in a passage of the same configuration as in FIGURE 19, but with the four sides of the passage being represented as opened up and lying in the same plane for convenience of representation.

Similarly, it will be noted that in muffler types of sound-abatement devices, such as the device 160 illustrated in FIGURES 24 and 25, the same type of deresonating assembly of units U having different attenuation characteristics has been followed, i.e., differing sequence and orientation of the different type of units U comprising each strip of the gas passage 168 in order to de-resonate such passage.

Certain precautions must be observed in order to obtain homogeneous attenuation characteristics throughout structures comprised of iterations of the elementary configurations shown in FIGURES 9, 11, 13, 16 and 19. In Iternated arrangements or configurations such as in FIGURE 10, all of the longitudinal strips of units U, i.e., extending parallel to the direction of gas flow, should have identical composition as to numbers and types of units in each strip. Adjacent strips should, however, be different with respect to the orientation and sequence of the units therein. In elementary configurations, however, such as those illustrated in FIGURES 11, 13, 16, and in iterations thereof, such as shown in FIGURES 12, 14, 17 and 20, respectively, the individual longitudinal strips of units forming the sound-attenuating faces of each elementary passage need not be identical in composition. In the iterations shown in FIGURES 12, 14, 17 and 20, however, all of the separate passageways should have the same composition, as to numbers and types of units, in order to insure homogeneous attenuation. In these cases the attenuation per passage, as for example the passages 144 in FIGURE 17, is the sum of the attenuation spectra of the units U which comprise the attenuating walls of the passage.

Solid-borne sound is considerably attenuated when the sound-carrying solid is discontinuous, even though the discontinuity is formed by abutting faces. Hence, in sound-abatement devices constructed of units embodying this invention and in which a plurality of units are abutted longitudinally of a sound channel or a gas passage, the longitudinally-abutting non-attenuating faces of the unit considerably reduce acoustic short-circuiting of the device.

The internal structure of the basic type of sound-attenuating unit illustrated in FIGURES 1, 2, and 3, may be modified in a number of different ways in order to obtain certain special acoustical and structural characteristics while retaining the objectives and principles of this invention. FIGURES 35 through 42 illustrate examples of such modifications.

The unit 188 illustrated in FIGURE 35 is substantially the same as that illustrated in FIGURES 1, 2, and 3, save that the decks 190 of the unit 188 are perforated instead of being imperforate. This construction tends to alter the attenuation curve in FIGURE 4 by lowering the low-frequency peak and raising the attenuations at the medium and high frequencies.

In the unit 192 illustrated in FIGURE 36 a single continuous perforated deck 194 is substituted for the two spaced imperforate decks 110 illustrated in FIGURE 2. Additionally, the sound-absorbing material is formed as a single continuous pad 196 which covers the entire deck 194. This construction tends to increase the high-frequency attenuation attributable to the sound-absorbing material at the expense of low-frequency attenuation.

In the unit 198 illustrated in FIGURE 37 the spaced decks 200 are devoid of the upturned edges 114 shown in FIGURE 2, and the opening 202 therebetween is covered by a continuous one-piece pad 204 of sound-absorbing material. This construction tends to lower and broaden the low-frequency attenuation while the portion of the attenuation attributable to the sound-absorbing material is increased.

FIGURE 38 illustrates a further modification of the basic unit 100 shown in FIGURE 2. In the unit 206 the opening 208 between the spaced decks 210 is completely filled with a body of sound-absorbing material 212, which material extends into the cavity 214 and partly fills the same. The attenuation characteristics of the unit 206 are similar to those of the unit 198 illustrated in FIGURE 37 save that the medium and high-frequency attenuations are increased at the expense of low-frequency attenuation.

The unit 216 illustrated in FIGURE 39 is identical to the basic unit 100 illustrated in FIGURE 2 save that adjustable means, such as the sliding gates 218, are provided for varying the area of the opening 220. Variation of this area adjusts or changes the acoustic response of the reactive attenuating system comprising the cavity 222 and the opening 220. This type of unit is particularly useful where adjustment of the acoustic response of the sound-attenuating means is required after installation in some sound-attenuating structure.

FIGURE 40 illustrates a unit 224 similar to that illustrated in FIGURE 2, but wherein the opening 226 is displaced toward one end of the unit. The effect of this construction is to give a relatively sharp attenuation peak at the frequency whose wavelength is approximately one-quarter of the distance between the opening 226 and that end of the cavity 228 remote therefrom.

The unit 230 illustrated in FIGURE 41 is substantially identical to the basic unit 100 illustrated in FIGURE 2 save for the omission of upturned edges on the spaced decks 232. The omission of such edges exposes the thickness of the sound-absorbing pads 234 to the sound wave in the opening 236. Such exposure causes a damping effect which tends to broaden the low-frequency attenuation peak.

The unit 238 illustrated in FIGURE 42 is also similar to the basic unit 100 illustrated in FIGURE 2 save for the complete omission of sound-absorbing pads. Because of this omission the decks 240 may be raised to the level of the rim of the case. This unit 238 has an attenuation curve determined entirely by its reactive impedance properties and which curve will be similar to that shown by the solid line in FIGURE 6A. Units of this type are useful in installations where a high degree of sound-absorption at high frequencies is not needed, or where the use of sound-absorbent materials is not feasible or desirable for some particular reason.

It will be understood that any of the modified types of units illustrated in FIGURES 35 through 42 may be adapted to multi-cavity internal constructions in accordance with the principles previously described with respect to the units illustrated in FIGURES 6, 7 and 8. It further will be understood that the use of foraminous covers is optional.

FIGURES 43 through 54, inclusive, illustrate further modifications of the elementary sound-attenuating structural unit 100 which have internal structures basically different from those previously described.

Referring now to FIGURES 43, 44 and 45, the unit 242 shown therein is provided with openings 244 at the opposite ends thereof while an upright, substantially diagonally disposed partition 246 divides the interior of the unit into two non-communicating substantially wedge-shaped equal-volume cavities 248, each exposed to sound only through a separate opening 244. It will be noted that the partition 246 extends only between the inner edges of the openings 244. The area of each opening 244 preferably is approximately equal to the area of the base or the open end of each wedge-shaped cavity 248. As in previous constructions, the deck 250 has upturned edges 252 adjacent the openings 244 to form a tray-like receptacle for a sound-absorbent pad 254, which latter may optionally be retained in place by an appropriate foraminous cover 256, as in the unit construction illustrated in FIGURE 2.

The unit 242 acts as a sound attenuating device having a combination of resonant and dissipative attenuating elements. The resonant elements are the cavities 248, while the sound-absorbing pad 254 forms the principal dissipative element. When the sound-attenuating unit 242 is installed so as to form a boundary for a sound passage, the wedge-shaped cavities 248 will produce peak attenuations for a series of sounds whose fundamental frequency corresponds to a wavelength equal approximately to twice the average of the length of the partition 246 and the distance between the openings 244, and to harmonics which are approximately integral multiples of the fundamental frequency. The cavities 248 also provide appreciable attenuation at frequencies between the above-mentioned adjacent peaks. Further, the presence of the sound-absorbing material 254 tends to broaden the above-mentioned attenuation peaks and to increase the attenuation in the valleys between such peaks.

FIGURES 46, 47 and 48 illustrate the construction of a unit 258 which is basically identical in concept and action to the unit 242 shown in FIGURE 43. In this instance, the interior of the unit 258 is divided into a multiplicity of small non-communicating equal sections by equally-spaced transverse upright partitions 260. Each section is, in turn, divided into two non-communicating wedge-shaped cavities 262 by a substantially diagonal partition 264. The cavities 262 are exposed to sound through openings 266. The attenuation effect of this unit 258 is produced through the same types of actions as were described above in connection with the unit 242. Obviously, the fundamental frequency and its harmonics are higher for the unit 258 than for the unit 242.

FIGURES 49, 50 and 51 again illustrate the construction of a unit 268 which is basically identical in concept and action to the unit 242 depicted in FIGURE 43. In this instance, the interior of the unit 268 is divided into six non-communicating wedge-shaped cavities 270 by a central upright transverse partition 272 and two oppositely inclined substantially diagonal partitions 274. Again, each cavity 270 is exposed to external sound only through an opening 276 at its base.

FIGURES 52, 53 and 54 show a variation of the unit 268 illustrated in FIGURE 49. This modified unit 278 has no sound-absorbent pads, so that the decks 280 may be raised and the cover omitted. Except for these omissions, the two constructions are essentially identical. The action of the unit 278 is similar to that described in connection with FIGURE 42, above, except that no dissipative absorption due to sound-absorbing material is present. The omission of sound-absorbing material may be required for various reasons which were previously mentioned in a similar connection.

Obviously, the units 242 and 258 shown in FIGURES 43 and 46, respectively, may be similarly modified by omitting their sound-absorbing pads and covers and raising their decks.

It will thus be seen that the objects and advantages of this invention have been fully and effectively accomplished. It will be realized, however, that the specific embodiments shown and described to illustrate the principles of this invention are subject to modification without departing from such principles. For example, sound attenuating units embodying this invention may be used to line the walls, or portions thereof, of a room for effective sound insulation of the same. Additionally, although all of the units have been illustrated and described as being in the form of a right parallelepiped, it will be realized that each unit need not be strictly in the shape of a right parallelepiped and that all of the faces of the units need not be strictly planar. Obviously, six-sided units not strictly in the shape of parallelepipeds will perform substantially as well as units strictly in the shape of parallelepipeds. Therefore, this invention includes all modifications encompassed within the spirit and scope of the following claims.

This application is a continuation-in-part of my co-pending application, Serial No. 306,323, filed August 26, 1952 (now abandoned).

I claim:

1. A sound-abatement device comprising: means defining a sound channel at least a portion of the boundary of which is defined by the attenuating faces of a plurality of discrete sound-attenuating structural building units of generally right parallelepiped shape having at least two pairs of opposite substantially imperforate faces and a fifth sound-attenuating face, the dimensions of said fifth faces of all of said units being substantially identical and each of said units being provided with a least one interior chamber having access to a sound field in the channel solely through an acoustically substantially unobstructed corresponding opening in said fifth face, said chamber and opening constituting an acoustic side branch, said units being arranged in adjoining relation laterally of said channel, and the pattern of the openings longitudinally along the channel being different in laterally adjoining units.

2. A sound-abatement device comprising: means defining a sound channel at least opposed portions of the boundary of which are defined by the attenuating faces of a plurality of opposed discrete sound-attenuating structural building units, each of generally right parallelepiped shape having at least two pairs of opposite substantially imperforate faces and a fifth sound-attenuating face, the dimensions of the fifth faces of all of said units being substantially identical and each of said units being provided with at least one interior chamber having access to a sound field in the channel solely through an acoustically substantially unobstructed corresponding opening in said fifth face, said chamber and opening constituting an acoustic side branch and the pattern of said openings longitudinally along the channel being different in opposed units, the spacing between the attenuating faces of opposed units being not greater than about the wavelength of sound corresponding to the highest frequency to be reactively attenuated in said channel by said side branches.

3. A sound-attenuating discrete structural building unit of generally right parallelepiped shape having at least one chamber therein and at least two pairs of opposite substantially imperforate faces, a fifth face of said unit being adapted to be exposed to an exterior sound field and having adapted to be exposed to an exterior sound field and having at least one acoustically substantially unobstructed opening therethrough, said chamber having access to the exterior sound field through said opening and said chamber and opening constituting a reactive sound-attenuating system, said unit including plate-like deck means parallel to and offset inwardly of said fifth face and having said opening extending therethrough, and a layer of sound-absorbing material overlying said deck means.

4. The structure defined in claim 3 in which the deck means is imperforate.

5. The structure defined in claim 3 in which the deck means is perforated and acoustically transparent.

6. The structure defined in claim 3 in which the deck means defines one side of the chamber and including an acoustically-transparent foraminous cover overlying the sound-absorbing material and the opening and defining the fifth face.

7. The structure defined in claim 3 in which the deck means defines one side of the chamber and the edges of said deck means adjacent the opening are extended outwardly to define, and in conjunction with certain of the imperforate faces of the two pairs peripherally bounding the fifth face, tray-like receptacle means, and wherein the sound-absorbing material is disposed in said receptacle means.

8. A set of sound-attenuating discrete structural building units for use in forming at least a portion of the boundary of a sound or gas passage, each unit being of generally right parallelepiped shape having at least one interior chamber and at least one of said units having at least two interior chambers, each of said units having at least two pairs of opposite substantially imperforate faces and a fifth face adapted to be exposed to the sound field in the passage, said fifth face having an acoustically substantially unobstructed opening therethrough for each chamber, said opening providing sole access for the corresponding chamber to the exterior sound field and each of said chambers and its corresponding opening constituting a reactive sound-attenuating system, the dimensions of said fifth faces, and the dimensions of said chambers normal to said fifth faces, of all of said units being substantially identical and the volume of a chamber of at least one of said units being different from that of a chamber of at least one other of said units, whereby the sound-attenuating characteristics of said one unit are different from those of said other unit.

9. A set of units as defined in claim 8 arranged in at least one row extending longitudinally of a sound or gas passage with their fifth faces forming at least a portion of the boundary of said passage.

10. A set of units as defined in claim 8 wherein the pattern defined by the opening in the fifth face of at least one of the units of the set is unsymmetrical with respect to opposite edges of its fifth face.

11. A set as defined in claim 10 wherein the fifth face of each unit has one dimension longer than the other and the pattern of said one unit is unsymmetrical with respect to the ends of said fifth face.

12. A set as defined in claim 11 wherein the opening in the one unit extends substantially entirely across the fifth face in the direction of its shorter dimension.

13. A set of units as defined in claim 8 arranged in at least two closely adjacent rows extending longitudinally of, with their fifth faces forming at least a portion of the boundary of, a sound or gas passage, the pattern longitudinally along each row formed by the openings in the fifth faces of the units making up the row being different from the pattern in the adjacent row.

14. A set of sound-attenuating discrete structural building units for use in forming at least a portion of the boundary of a sound or gas passage, each unit being of generally right parallelepiped shape having at least one interior chamber, at least two pairs of opposite substantially imperforate faces, and a fifth face adapted to be exposed to the sound field in the passage, said fifth face having one of its dimensions greater than the other and being provided with an acoustically substantially unobstructed opening extending substantially thereacross in the direction of its shorter dimension, said chamber having access to the exterior sound field in the passage solely through said opening and said chamber and opening constituting a reactive sound-attenuating system, and the dimensions of the fifth faces of all of said units being substantially identical.

15. A set of units as defined in claim 14 wherein the dimension of the opening in each unit in the direction of the longer dimension of the fifth face is of the order of from one-half to one-quarter of the corresponding dimension of the chamber.

16. A set as defined in claim 14 in which the pattern defined by the opening in the fifth face of at least one of the units is unsymmetrical with respect to the ends of the fifth face of said one unit.

17. A set of units as defined in claim 14 arranged so that their fifth faces define at least a portion of the boundary of a sound or gas passage with the longer dimension of the fifth face of each unit extending longitudinally of the passage.

18. A set of units as defined in claim 14 arranged in at least two closely adjacent rows extending longitudinally of, with their fifth faces forming at least a portion of, a sound or gas passage, the longer dimension of each unit extending longitudinally of said passage and the pattern in each row formed by the openings in the fifth faces of the units making up the row being different from the pattern in the adjacent row.

19. A set of units as defined in claim 14 wherein the dimensions of the chamber of at least one of the units of the set differs from those of the chamber of at least one other unit of the set, whereby the sound-attenuating characteristics of said one unit differ from those of said other unit.

20. A set as defined in claim 14, wherein at least one unit of the set has at least a portion of its fifth face provided with an exteriorly-acoustically-exposed layer of sound absorbing material to provide dissipative sound attenuation.

21. A set as defined in claim 14, in which at least one of the units has a plurality of openings in its fifth face and a like number of non-communicating interior chambers each having access to the exterior sound field solely through a separate one of said openings.

22. A set as defined in claim 21 in which the chambers in the one unit are of unequal volume.

23. A set of sound-attenuating discrete structural building units for use in forming at least a portion of the boundary of a sound or gas passage, each unit being of generally right parallelepiped shape having at least two pairs of opposite substantially imperforate faces and a fifth face adapted to be exposed to the sound field in the passage and having one dimension greater than the other, the dimensions of the fifth faces of all of said units being substantially identical and each unit having a combination of reactive and dissipative sound-attenuating means effective at its fifth face, said reactive means comprising at least one interior chamber and an acoustically substantially unobstructed opening in the fifth face extending substantially thereacross in the direction of its shorter dimension and providing sole access for said chamber to an exterior sound field.

24. A sound-attenuating passage having at least a portion of its boundary defined by the attenuating faces of a plurality of discrete sound-attenuating units, each generally in the shape of a right parallelepiped having at least one interior chamber, at least two pairs of opposite substantially imperforate faces, and a fifth sound-attenuating face having an acoustically substantially unobstructed opening therethrough providing sole access for said chamber to a sound field in said passage, said chamber and opening constituting a reactive sound-attenuating system and the dimensions of the fifth faces of all of said units being substantially identical, said units being arranged in at least two laterally adjacent rows extending longitudinally of said passage with the pattern longitudinally along each row formed by the openings in the fifth faces of the units making up the row being different from the pattern in the laterally adjacent row.

25. A sound-attenuating passage having at least a portion of its boundary defined by the attenuating faces of a plurality of discrete sound-attenuating units, each generally in the shape of a right parallelepiped having at least one interior chamber, at least two pairs of opposite substantially imperforate faces, and a fifth sound-attenuating face having an acoustically substantially unobstructed opening therethrough providing sole access for said chamber to a sound field in said passage, said chamber and opening constituting a reactive sound-attenuating system and the dimensions of the fifth faces of all of said units being substantially identical, said units being arranged in at least two spaced opposed rows extending longitudinally of said passage with the pattern longitudinally along each row formed by the openings in the fifth faces of the units making up the row being different from the pattern in the opposed row, the spacing between said rows being not greater than about the wavelength of sound of the highest frequency to be reactively attenuated by said systems.

26. A sound-abatement device comprising: wall means defining a substantially unobstructed sound passage, said wall means having at least two laterally adjacent longitudinally segments of substantially equal width; means including said wall means defining at least one chamber outside of said passage for each of said segments, said wall means having in each of said segments an acoustically substantially unobstructed opening therethrough, each of said openings communicating said chamber of the corresponding segment with said passage, each of said chambers having access to a sound field in said passage solely through the corresponding opening and each chamber and corresponding opening constituting an acoustic side branch, the pattern of said openings in each segment, longitudinally along said passage, being different in laterally adjacent segments.

27. A sound-abatement device comprising: wall means defining a substantially unobstructed sound passage, said wall means having at least two opposed longitudinal segments of substantially equal width on opposite sides of said passage; means including said wall means defining at least one chamber outside of said passage for each of said segments, said wall means having in each of said segments an acoustically substantially unobstructed opening therethrough, each of said openings communicating said chamber of the corresponding segment with said passage, each of said chambers having access to a sound field in said passage solely through the corresponding opening and each chamber and corresponding opening constituting an acoustic side branch, the pattern of said openings in each segment, longitudinally along said passage, being different in opposed segments, and the distance between said opposed segments being not greater than about the wavelength of sound of the highest frequency to be reactively attenuated in said passage by said side branches.

28. A set of units as defined in claim 14 arranged in at least two opposed rows extending longitudinally of, with their fifth faces forming at least a portion of, opposite sides of a sound or gas passage, the longer dimension of each unit extending longitudinally of said passage and the pattern in each row formed by the openings in the fifth faces of the units making up the row being different from the pattern in the opposed row, the distance between said opposed rows being not greater than about the wavelength of sound of the highest frequency to be reactively attenuated in said passage by said units.

29. A set of units as defined in claim 14 in which the opening in the fifth face of each unit is provided with an acoustically-transparent foraminous cover for minimizing resistance to flow of gas over and parallel to said fifth face.

30. A set of units as defined in claim 14 in which the exterior dimension of all of said units are substantially identical.

31. A sound-abatement device comprising: means defining a sound channel for the passage of engine exhaust gas, said channel means including means defining at least two substantially coextensive laterally adjacent groups of side branch acoustic chambers, each having an opening communicating the corresponding chamber with said channel, and the pattern of the openings in each group, longitudinally along said channel, being different from that in laterally adjacent groups.

32. A sound-abatement device comprising: means defining a sound channel for the passage of engine exhaust gas, said channel means including means defining at least two substantially coextensive opposed groups of side branch acoustic chambers on opposite sides of said channel, each of said chambers having an opening communicating the corresponding chamber with said channel, and the pattern of the openings in each group, longitudinally along said channel, being different from that in the opposed group.

References Cited in the file of this patent

UNITED STATES PATENTS

| | | |
|---|---|---|
| 2,007,130 | Munroe et al. | July 2, 1935 |
| 2,152,169 | Appel | Mar. 28, 1939 |
| 2,297,269 | Wendt et al. | Sept. 29, 1942 |
| 2,308,886 | Mason | Jan. 19, 1943 |
| 2,674,336 | Lemmerman | Apr. 6, 1954 |

FOREIGN PATENTS

| | | |
|---|---|---|
| 112,975 | Australia | Apr. 23, 1941 |
| 135,180 | Australia | Nov. 8, 1949 |
| 638,407 | Great Britain | June 7, 1950 |
| 131,432 | Sweden | Apr. 24, 1951 |